Jan. 13, 1970  R. MARCELLIN  3,489,023
PROGRAMMER DEVICE FOR THE CONTROL OF CYCLIC OPERATIONS
Filed June 5, 1967
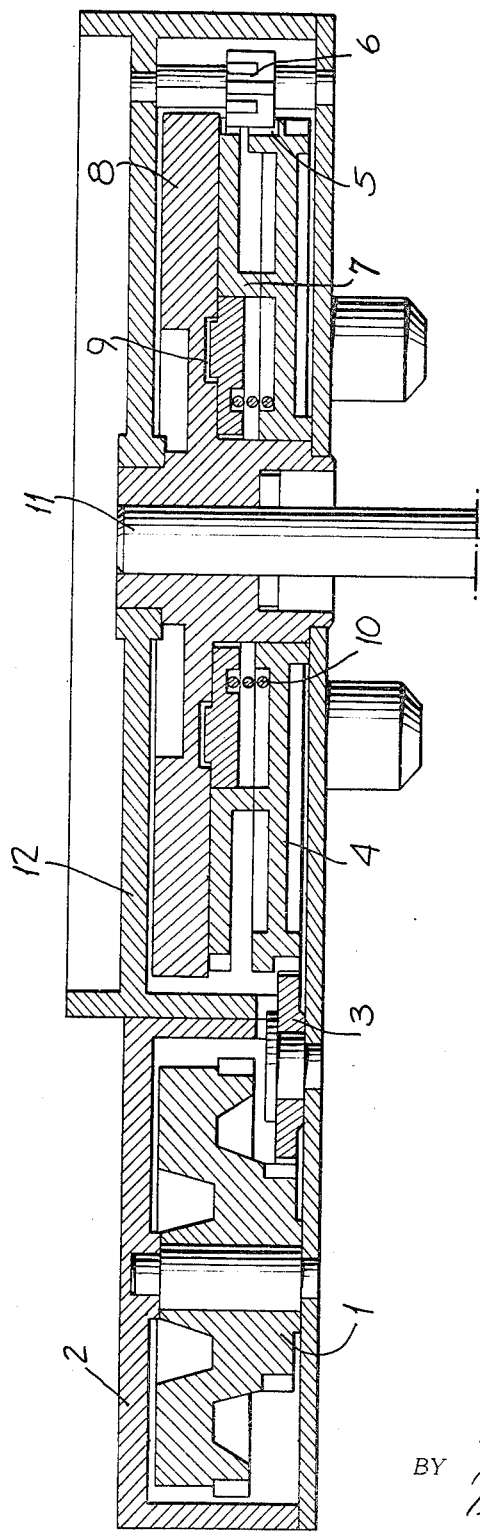
INVENTOR.
RENÉ MARCELLIN
BY
ATTORNEYS United States Patent Office 3,489,023
Patented Jan. 13, 1970

3,489,023
PROGRAMMER DEVICE FOR THE CONTROL
OF CYCLIC OPERATIONS
René Marcellin, Monaco (Principality), assignor to Europe Manufacturing Trust Reg., Vaduz, Liechtenstein, a trust of Liechtenstein
Filed June 5, 1967, Ser. No. 643,425
Claims priority, application France, June 7, 1966, 64,466
Int. Cl. F16h 35/02
U.S. Cl. 74—112                              4 Claims

ABSTRACT OF THE DISCLOSURE

A motor driven device for driving a programming cam which controls the operation of an electrical appliance. The device intermittently rotates a second gear and thus moves the cam a small amount during each revolution of a control gear which is coupled to the second gear by a pinion gear driven by a cog or single tooth on the control gear.

---

The present invention concerns programming devices adapted for the control of operations carried out cyclically, such devices being especially used for appliances such as clothes washing machines, dish-washers, machine tools, etc.

Hitherto known devices include a spring which is tightened during the rotation of a moving unit and the stored energy of which is used to rotate a cam which, in turn, moves a series of electric contacts necessary to insure a succession of operations.

The prior art programming devices utilize relatively complicated structural components, which are costly to fabricate and necessitate intricate assembly operations to effect a completed device.

The programmer device described in the present invention does not have these drawbacks. The programming device includes basic structural elements which are relatively inexpensive to fabricate and uncomplicated to assemble. Furthermore, the device performs in a very reliable manner.

This device includes a driving gear having, a gear connected with a pilot gear and, on the other hand, one or several teeth operating step by step a pinion gear coupled with a gear which drives the cam operating the contacts by means of a ratchet mechanism with a catch, such as a pawl and ratchet.

According to another characteristic of the invention, a spring means acts on the ratchet mechanism in order to hold together the parts of the ratchet mechanism while allowing the manual operation of the cam independently of the automatic programming device.

The invention will be described in greater detail with reference to a preferred embodiment thereof illustrated in the accompanying drawing, in which:

FIG. 1 shows a cross-sectional view of the programming device according to the instant invention.

A motor with reduction gearing (not shown) drives a gear 1 journaled in a housing 2. The gear 1 is coupled to an intermediate gear 3 which in turn is connected to a first annular control gear 4 having a cog or tooth 5 which is on one radial face thereof. During each revolution of the annular control gear 4, the tooth 5 engages and drives a small pinion gear 6 one step.

The pinion gear 6 rotates on an axis radially outwardly of the periphery of gear 4 and is coupled with a second annular gear 7 which is coaxial with the control gear 4. The annular gear 7 controls the rotation of the programming cam 8 by means of a clutch type ratchet mechanism 9 with a catch, such as a pawl and ratchet. The units of this ratchet mechanism 9 are biased together by a spring 10.

The cam 8 is coupled with an axle 11 and the assembly is journaled in a housing 12 which can be coupled with the housing 2. Axle 11 can be rotated manually thereby rotating cam 8 to any desired position. During the manual rotation of cam 8 the ratchet 9 slips, that is, the ratchet remains substantially stationary, as does gear 7, while the cam 8 is manually rotated relative thereto.

The above described construction allows the programming cam 8 to be driven under the influence of the motor in step-by-step or intermittent fashion in order to carry out the required cycle of operations. Furthermore, the ratchet mechanism 9 positively engages the cam 8 and thereby maintains it in a fixed position during the time period between drive steps.

Further, such construction allows the rotation and the manual positioning of the cam independently of the motor driven gear train by means of unidirectional operation of the clutch type ratchet mechanism which is based against the cam 8 by means of the spring 10 permitting manual rotation of the cam 8 in one direction only.

Instead of a single cog or tooth 5, two or several circumferentially spaced cogs or teeth may be provided on the annular gear 4 according to the number of impulses one wants to communicate to the gear 6 for each rotation of such annular gear.

The programming cam 8 actuates in the usual manner the electric contacts controlling the working circuits of the components of the washing machine or other appliance.

It must be understood that the invention is not limited to the construction described and represented. The device made according to the invention may be utilized to control a succession of operations according to a determined program, e.g. to control signalling systems, machine tools, washing machines, dish-washers, etc.

I now claim:

1. A timer-programmer for actuating the circuits of a washer or the like for establishing cyclic operations comprising:
   a housing;
   a motor driven gear means, disposed within said housing;
   a control gear in driven engagement with said motor driven gear means, said control gear having at least one tooth thereon;
   a pinion gear having a plurality of teeth thereon, wherein said at least one tooth of said control gear is in meshing engagement with said pinion gear once during each revolution of said control gear for providing incremental rotation of said pinion gear;
   a second gear means in driven engagement with said pinion gear;
   at least one programmer cam;
   a clutch mechanism interconnecting said second gear means and said at least one programmer cam, said clutch mechanism for transmitting motion to cam in the direction determined by the motion of said motor driven gear; and
   means to manually rotate said at least one programmer cam.

2. A timer-programmer according to claim 1 wherein said clutch mechanism includes slip means at the interconnection of said programmer cam and said second gear, said slip means precluding the transmittal of motion during manual rotation of said at least one programmer cam to said second gear.

3. A timer-programmer for establishing cyclic operation of the circuits of a washer or the like comprising:
a housing;
a motor driven gear means disposed within said housing;
a control gear in driven engagement with said motor driven gear means, said cotrol gear having at least one tooth thereon;
a pinion gear having a plurality of teeth thereon, said pinion gear being located radially outwardly of said control gear, wherein said at least one tooth on said control gear meshes with said pinion gear once during each revolution to provide incremental rotation of said pinion gear;
a second gear mounted in driven relation with said pinion gear;
at least one programmer cam;
a clutch mechanism interconnecting said second gear means and said at least one programmer cam, said clutch mechanism including an annular toothed member coupled to said at least one programmer cam for transmitting motion thereto in a single direction determined by the normal rotation of said motor driven gear means.

4. A timer-programmer according to claim 3, comprising means to manually rotate said at least one programmer cam, wherein said at least one programmer cam slips with respect to said annular toothed member to preclude the transmission of manually initiated motion of said cam to said second gear.

References Cited

UNITED STATES PATENTS

| | | | |
|---|---|---|---|
| 2,507,756 | 5/1950 | Boylan | 74—112 |
| 2,757,569 | 8/1956 | Isom | 74—112 |
| 3,223,205 | 12/1965 | McCurdy | 74—112 |
| 3,125,105 | 3/1964 | Geiger | 68—12 |
| 3,151,257 | 9/1964 | Anderson | 68—12 |
| 3,215,867 | 11/1965 | Melinger | 68—12 |

FOREIGN PATENTS 352,729   4/1961   Switzerland.

FRED C. MATTERN, JR., Primary Examiner

W. S. RATLIFF, JR., Assistant Examiner

U.S. Cl. X.R.

68—12